Patented Sept. 18, 1951

2,568,369

UNITED STATES PATENT OFFICE 2,568,369

FOOD PRODUCTS AND METHOD OF MAKING THE SAME

Louis A. Scholz, Baltimore, Md.

No Drawing. Application December 14, 1948, Serial No. 65,281

9 Claims. (Cl. 99—130)

This invention relates to food products, especially a product adapted to be mixed with hot water and other hot liquids to be drunk as an invigorant or food.

A principal object is to provide a food product which includes a milk component, for example cream, in a jelly-like or gel state, so that it may be cut, wrapped, handled and even washed, yet will dissolve quickly in a cup of hot coffee, tea, cocoa or the like to provide the desired complement of milk or cream and if preferred, sugar also. Such a product may be stamped or otherwise marked with harmless vegetable dyes to give a surface coloring where desired, or may be stamped, marked or impressed to show a trade name or trade-mark, thus identifying the product as originating from a certain source. However, the invention has other objects, as will appear from the following description of several embodiments thereof and of alternative processes for making the preferred form of the invention.

Method A

In accordance with this method, I start with one pint of sweet cream, preferably of the grade known as "coffee cream," and approximately one ounce of dry gelatin, preferably in sheet form, although it may be granulated. I put the dry gelatin in the cream, cooled to 40°–60° F. and let stand for from five to thirty minutes, or until the gelatin feels quite soft. The richer the cream the slower the gelatin softens. Then I warm the mixture to approximately 90°–95° F., stirring constantly. Occasional stirring may result in a poor or a passable product. Five minutes of stirring at 90° F. is sufficient. Then I pour the mixture into molds and let it set or jell. The product may now be packaged, preferably in tin or aluminum foil, and if refrigerated will keep much longer than the cream from which it is made.

Method B

Alternatively, I soak the gelatin (approximately one ounce, as before) in cool water (40°–60° F.) until it is soft to the touch. Then I drain off excess water and add the softened gelatin to cream which may be cool or warm (90° F.), and stir until the mixture is homogeneous. This takes five minutes. Then I pour the mixture into molds and let it set or jell, which it will do at between 60° and 65° F. The product may now be packaged, as it is not noticeably different from the product of Method A.

Method C

To make a food product suitable for invalids and children, as well as a complement for coffee, tea, etc., I take one-half ounce of dry gelatine and soak it in cool water until soft, then drain the excess water off. The water-softened gelatine is then warmed to 90° F. to form a sirupy sol. Then I add four ounces of powdered milk to make a stiff paste, which may be compressed and forced into molds or pans, and afterwards cut and packaged. One quart of water added to the paste will yield a milky mixture suitable for feeding invalids or children.

All three methods may be varied or modified by substituting other milk or gelatin components or by adding the desired amount and type of sugar.

Instead of cream or milk powder, I may employ raw whole milk, pasteurized whole milk, homogenized milk, skim milk, evaporated milk or condensed milk, all from cows; or for certain dietary requirements I may employ goat's milk.

Instead of gelatin I may employ gum acacia, gum arabic, albumin, agar or starch, but gelatin is superior to any of the others.

Instead of sugar (sucrose) I may employ glucose, lactose, fructose, levulose or dextrose, increasing the amounts to give the desired sweetness, which is the sweetness imparted by two teaspoonfuls of sugar (sucrose) to a cup of coffee. Each packaged unit of the product should contain two teaspoonfuls of sugar (sucrose) or its sweetness-equivalent in the sugar substituted for sucrose, plus the amount of cream (about three-quarters of an ounce) normally added to a cup of coffee.

The described products will dissolve in hot coffee or tea as rapidly as does lump sugar, and will give the same taste as cream or cream and sugar; in other words, the gelatin can not be detected in coffee or tea when present in the product of the invention in the operable range of between 1% and 40% by weight. Certain rich cocoas will not need to be mixed with the products, but ordinary commercial watery cocoas will be greatly enriched and improved by the addition of any of the products of Methods, A, B and C.

To the products of said methods I may also add powdered coffee, or a soluble coffee, in sufficient strength to make one cup of coffee from each wrapped or packaged unit. The units may be cubical, or parallelopipeds, or round disks, or may assume any other form conveniently made by the manufacturer. For special occasions, special molds may of course be used. The weight of the units may vary from three-quarters of a liquid ounce to a two ounces, the heavier units being employed when soluble coffee and sugar are both blended with the basic gelatinized milk product.

Any of the products of the invention is easier to handle and ship than cream, may be wrapped in parchment paper or cellophane as well as a metal foil, will keep sweet longer than cream, may be washed in cold water without deleterious effects, and may even stand in cold water for some time, as cold water merely causes a slight swelling. Hence, if desired, the units may be placed on chipped, melting ice, or in other words may be treated like butter, which will be a great convenience in restaurants.

Having described my invention, what I claim as new and desire to secure by Letters Patent is:

1. As a new food product, a gel adapted to be dissolved in hot drinks consisting of a milk component, a gelatin component and a sugar component; the milk component being selected from the group consisting of cow's milk, goat's milk, cream from cow's milk, and milk powder the gelatin being present to the extent of not more than 40% or less than 1% by weight the sugar being present in the proportions of approximately two teaspoonsful to each three-quarters liquid ounce to one liquid ounce of milk component; the three components forming a substantially homogeneous product which is a gel below 85° F.

2. As a new food product, a substantially homogeneous gel adapted to be dissolved in hot drinks consisting solely of gelatin, water and cream from cow's milk the gelatin being present to the extent of not more than 40% by weight or less than 1% by weight.

3. As a new food product, a substantially homogeneous gel adapted to be dissolved in hot drinks consisting solely of gelatin, water, cream from cow's milk, and sugar; the gelatin being present to the extent of two to three per cent by weight, the product being a gel below 85° F.

4. As a new food product, a substantially homogeneous gel adapted to be dissolved in hot drinks consisting solely of a gelatin component, a milk component and a sugar component; the gelatin being present to the extent of not more than 40% by weight or less than 1% by weight; the milk component being selected from the group consisting of cow's milk, goat's milk, cream from cow's milk, and milk powder; the sugar component being selected from the group consisting of sucrose, lactose, glucose, and fructose.

5. A packageable gel adapted to be dissolved in hot drinks, said gel consisting solely of gelatin present to the extent of not more than 40% by weight or less than 1% by weight and cream mixed together to form a homogeneous gel below 85° F.

6. A packageable food product adapted to be dissolved in hot drinks, said product consisting solely of water-softened gelatin, present to the extent of not more than 40% by weight or less than 1% by weight cream, and sugar; the several ingredients forming a substantially homogeneous gel below 85° F.

7. A method of making a food product which is readily dissolved in hot water solutions, infusions and other hot liquid food preparations, said method comprising taking one pint of sweet cream, cooling the cream if necessary to 40°–60° F., putting approximately one ounce of dry gelatin into the cool cream and letting stand for 5 to 30 minutes until the gelatin feels soft to the touch, with constant stirring, until a homogeneous mixture results, then pouring into molds and letting the product jell.

8. A method of making a food product which is readily dissolved in hot water solutions, infusions and, other hot liquid food preparations, said method comprising soaking approximately one ounce of dry gelatin in cool water (40°–60° F.) until soft, then draining off excess water, then adding the softened gelatin to one pint of sweet cream which is at a moderate temperature (40°–90° F.), then warming the mixture to approximately 90°–95° F., stirring the mixture until homogeneous, then pouring into molds and letting it jell.

9. A method of making a food product which is readily dissolved in hot water solutions, infusions, and other hot liquid food preparations, said method comprising soaking approximately one ounce of dry gelatin in cool water until soft, then draining excess water off, then warming the water-softened gelatin to about 90° F. to form a sirupy sol, then adding powdered milk to the extent of 4 ounces to make a stiff paste, then putting the mixture in molds or receptacles and letting it jell.

LOUIS A. SCHOLZ.

REFERENCES CITED

The following references are of record in the file of this patent:

UNITED STATES PATENTS

| Number | Name | Date |
| --- | --- | --- |
| 2,253,614 | Epstein et al. | Aug. 26, 1941 |

FOREIGN PATENTS

| Number | Country | Date |
| --- | --- | --- |
| 20,494 | Great Britain | 1889 |
| 15,008 | Great Britain | 1904 |
| 376,588 | Great Britain | July 14, 1932 |